Oct. 28, 1924.
J. F. O'CONNOR
1,513,125
FRICTION SHOCK ABSORBING MECHANISM
Original Filed July 12, 1920
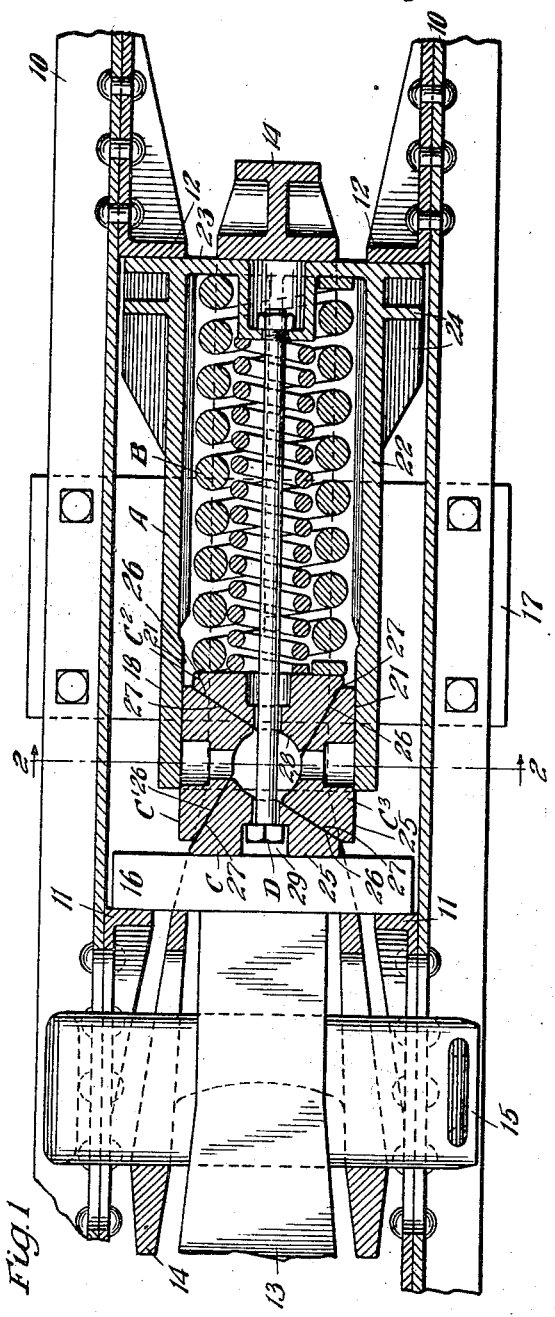
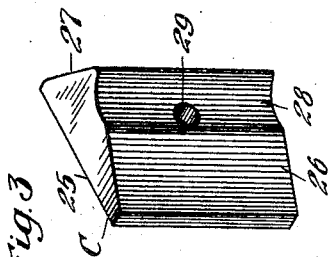
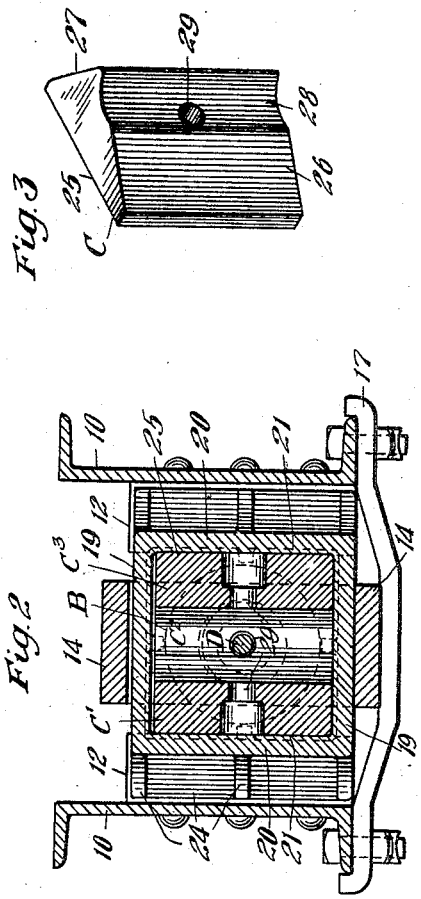
Witnesses
Wm. Geiger
Inventor
John F. O'Connor
By Geo. I. Haight
His Atty.

Patented Oct. 28, 1924.

1,513,125

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 12, 1920, Serial No. 395,459. Renewed April 10, 1924.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of the invention is to provide a friction shock absorbing mechanism especially adapted for railway draft riggings wherein is obtained high capacity and certain release by the use of few parts of economical construction.

Another object of the invention is to provide a mechanism of the character indicated wherein is employed an arrangement of friction shoes and wedges such that certain sets of faces thereof are wedge-acting and other sets non-wedge-acting or substantially so during the compressive action of the mechanism, said sets of faces acting reversely during release whereby is obtained a relatively keen angled wedging effect during the compressive stroke and a blunt angled effect in release.

A specific object of the invention is to provide a mechanism of the character indicated wherein are employed a plurality of combined friction shoes and wedges so constructed that the combined shoes and wedges are all duplicates and thereby interchangeable, said parts being all made from a single pattern to thereby minimize initial cost of manufacture and cost of maintaining parts for purposes of repair or replacement.

Other objects of the invention will more clearly appear from the description hereinafter following.

In the drawing forming a part of this specification, Figure 1 is a horizontal longitudinal sectional view of a portion of a railway draft rigging showing my improvements in connection therewith. Figure 2 is a vertical transverse sectional view taken substantially on the line 2—2 of Figure 1. And Figure 3 is a detail perspective of one of the friction elements employed in my construction.

In said drawing, 10—10 denote channel shaped center or draft sills of a railway car to the inner faces of which are secured front stop lugs 11 and rear stop lugs 12. A portion of a drawbar is indicated at 13 to which is connected a slotted cast yoke 14 by means of a coupler key 15. The shock absorbing mechanism proper, hereinafter described, and a front follower 16 are disposed within the yoke. The yoke and movable parts associated therewith are held in proper position by a detachable saddle plate 17.

The improved shock absorbing mechanism proper, as shown, comprises, broadly, a combined friction shell and spring cage casting A; a spring resistance B; four duplicated elements C, C', $C^2$ and $C^3$; and a retainer bolt D.

The casting A has the friction shell proper 18 formed at the forward or outer end thereof, said shell being of generally square formation as is also the spring cage. The shell has upper and lower walls 19—19 and side walls 20—20, the latter being provided on their inner sides with flat friction surfaces 21—21. The spring cage 22 constituting the rear portion of the casting A is provided with an integral rear wall 23 which is laterally extended so as to adapt the same to act as a rear follower. Suitable strength is obtained by bracing ribs and flanges 24—24.

The spring B is of usual construction, the same embodying an outer heavy coil and an inner lighter nested coil, both coils bearing at their rear end against the wall 23 and at their forward end against the element $C^2$. The retainer bolt D passes through suitable perforations in the elements C, $C^2$, and rear wall of the casting A and through the center of the spring B. The bolt D is adapted to hold all of the parts in assembled relation and also to maintain the spring under an initial compression, when desired.

As heretofore indicated, all of the elements C, C', $C^2$ and $C^3$ are of like construction and it will only be necessary to describe the structural features of one of them in detail. Each of said elements is formed with a flat face 25 on one side and with faces 26 and 27 extending respectively at relatively acute and relatively blunt angles with respect to the face 25. Between the adjacent edges of the faces 26 and 27, each of said elements is formed with a concave recess indicated at 28 constituting, in effect, approximately one-fourth of a cylindrical surface, as will be clear from an inspection of Figure 1 where all four of said elements are shown in their assembled position. Each of said elements is also centrally recessed as indicated at 29 to accommodate the bolt, the recess being enlarged at the side of the block corresponding to the flat face 25 to accommodate the head of the bolt or nut.

The four elements C, C', C² and C³ are arranged as clearly shown in Figure 1. In this arrangement the element C has its flat face 25 in engagement with the follower 16 and its face 26 extending at a relatively blunt and non-wedge-acting angle with respect to the axis of the shell when pressure is applied in lines parallel to said axis. The other face 27 of the element C will obviously extend at a relatively acute and wedge-acting angle with respect to the said axis when forces are applied parallel thereto. The elements C and C² are oppositely disposed and the elements C' and C³ are also oppositely disposed. All four elements are symmetrically arranged with respect to a line corresponding to the axis of the cylindrical surface defined by the recesses 28—28, i. e., a line which would be perpendicular to the sheet of the drawing and passing through the point of intersection of the section line 2—2 of Figure 1 and the axis of the shell.

From the preceding, it will be seen that the rear sets of surfaces 26 and 27 between the elements C' and C² will also be arranged at an obtuse releasing relatively non-wedge-acting angle with respect to the axis of the shell and forces applied substantially parallel thereto. Similarly, the set of faces 27 and 26 on the elements C² and C³ will extend at a keen wedge-acting angle with respect to the axis and forces applied substantially parallel thereto. Conversely, those two sets of faces which are at a relatively acute or keen wedge-acting angle with respect to forces applied parallel to the axis will be at a relatively blunt or obtuse non-wedge-acting angle with respect to inwardly radially directed forces and those sets of faces which are at a relatively blunt angle during the compressive stroke with respect to forces applied parallel to the axis, will be at a relatively acute and releasing angle with respect to inwardly radially directed forces during release.

The operation is as follows, assuming an inward or buffing movement of the drawbar. As the follower 16 is pushed rearwardly, the outer element C will travel in unison therewith and spreading, or sliding or wedging action will occur between the faces 27 and 26 of the elements C and C', respectively. No true or appreciable wedging action will occur between the faces 26 and 27 of the elements C and C³ respectively, but nevertheless the spreading force will be equalized on the two elements C' and C³ under the general law of action and reaction. At the inner ends of the elements C' and C³, a true and essential wedging action will occur between the faces 27 and 26 of the elements C² and C³ respectively but no true or appreciable wedging action will occur between the faces 26 and 27 of the elements C² and C' respectively although the outward or radially spreading pressure will be equalized as in the case at the outer ends of the elements C' and C³. Obviously, the spreading pressure or wedging angle effect may be made unusually great or acute to obtain as high capacity as desired. During the continuance of the compressive action, the shell will be slightly expanded and enormous forces stored up in the shell. Upon removal of the actuating force, the shell will contract to its normal condition and effect a collapse or release of the friction elements on the faces 26 and 27 of the elements C² and C', respectively and on the faces 27 and 26 of the elements C³ and C, respectively, thereby producing the effect of a blunt-angled wedge during the release action. Furthermore, the spring will assist in the release action or collapse of the friction elements since the spring will exert a pressure on the element C² which will be effective in pushing out the element C' because of the blunt angled engagement between the elements C² and C'. While the said force tending to push out the element C' will not cause any release or collapsing action at the engaging faces of the elements C and C', nevertheless the element C constitutes, in effect, a rigid part of the element C' and the outward movement of the latter will be communicated to the element C so as to effect a disengagement in a longitudinal separating manner between the faces 26 and 27 of the elements C and C³, respectively.

It will also be noted that, irrespective of the contracting forces of the shell, and considering the element C at the moment when the buffing or compressing force ceases, said element C is free to drop away from or disengage itself from the element C' since the face 27 of the element C³ opposes no resistance thereto. Following this, it is also evident that the element C' is free to disengage itself from the element C² since the faces 27 and 26 of said elements C' and C² likewise oppose no resistance thereto. This in turn leaves the elements C² and C³ free to functionally disengage with respect to each other and the element C³ with respect to the shell.

As the parts are initially released or collapsed, as hereinabove described, they are all relatively loose with respect to each other and may be readily projected outward by the spring and, in reaching their normal position, which is determined by the fixed over-all length of the mechanism, they are free to be automatically adjusted with respect to each other and to assume the initial normal or full release condition. It will be noted that ample clearance is left in the openings 29 for the retainer bolt to allow for lateral shifting of the wedge elements C and C² and in this connection, it will be understood by those skilled in the art that the actual amount of such lateral movement, in actual practice, is comparatively small when stated in terms of lineal measurement.

By the term "wedging" as herein used and applied to the faces 26 and 27 of the elements C' and C respectively, I mean that, during a compression stroke of the mechanism, said face 27 will slip on the face 26, due to the component of force being great enough to exceed the friction between said faces. By the term "non-wedging", as herein used and applied to the faces 26 and 27 of the elements C and C³, respectively, I mean that, in a compression movement of the mechanism, there will be no appreciable slippage of either of said faces 26 and 27 on the other. If there should be such slippage in either direction, it does not interfere in any way with the operation of the mechanism during compression and functions as what may be termed a "safety valve" for the parts with the certain result that the transversely opposed keen angle faces are rendered effective during compression of the mechanism and that release of the mechanism will take place freely and without difficulty by reason of the blunt angle of said faces 26 and 27 of the elements C and C³, respectively.

From the preceding description, it will be seen that only one pattern is required in the manufacture of all the four movable friction elements and the same may be interchangeably positioned with respect to the shell. This reduces the cost of manufacture and also reduces the cost of overhead on the part of the railroads where the elements are required to be carried in stock for purposes of replacement. Furthermore, in the event excessive wear occurs on the two elements C' and C³, i. e., those elements which normally act as true friction shoes, the position thereof may be changed so as to employ them as the outer and inner elements corresponding to those referenced C and C² and the latter substituted as the true friction shoes, thereby prolonging the life of the parts without additional expense.

I have herein shown and described what I now consider the preferred manner of carrying out the invention but the same is merely an illustration of only one of numerous embodiments of the invention and I contemplate all changes and modifications that come within the scope of the claims appended hereto.

I claim:

1. In a friction shock absorbing mechanism, the combination with a shell having longitudinally extending friction surfaces; of a spring resistance; and a plurality of like friction shoes and wedge elements cooperable with said friction shell and with each other, said elements having cooperating engaging faces, some arranged at a relatively acute wedge-acting angle and others at a relatively blunt non-wedge-acting angle during the compressive action.

2. In a friction shock absorbing mechanism, the combination with a friction shell having longitudinally extending friction surfaces; of a spring resistance; a plurality of friction shoes; and a plurality of wedging elements, said shoes and wedging elements having cooperating engaging faces, some of which are arranged at a relatively acute wedge-acting angle and others at a non-wedging angle with respect to the axis of the shell when actuating forces are applied substantially parallel thereto in a compression stroke.

3. In a friction shock absorbing mechanism, the combination with a friction shell having longitudinally extending friction surfaces; of a spring resistance; and four elements movable with respect to the shell, two of said elements constituting friction shoes and the remaining two acting as wedges and disposed at the opposite ends of the shoes, each element having two faces, one of which extends at a relatively acute wedging angle and the other at a non-wedging angle with respect to the axis of the shell when actuating forces are applied substantially parallel thereto in a compression stroke.

4. In a friction shock absorbing mechanism, the combination with a friction shell having interior longitudinally extending friction surfaces; of a spring resistance; a pair of oppositely disposed friction shoes of like construction but reversely arranged and each having a pair of faces extending at different angles with respect to the axis of the shell; and a pair of wedge members of like construction and reversely arranged, one being disposed at the outer ends of the shoes and the other at the inner ends of the shoes, said wedges having faces corresponding to the faces of the shoes.

5. In a friction shock absorbing mechanism, the combination with a friction shell having longitudinally extending friction surfaces; of a spring resistance; and four elements movable with respect to the shell and cooperable therewith, each of said elements having two faces extending one at a relatively acute and the other at a relatively blunt angle with respect to the axis of the shell, two of said elements acting as friction shoes, a third as a pressure-transmitting member and the fourth as a wedge follower having engagement with one end of the spring resistance.

6. In a friction shock absorbing mechanism, the combination with a friction shell having interior friction surfaces; of a spring resistance; a plurality of elements relatively movable with respect to the shell, said elements being all of like construction and each formed with two faces, one of which extends at a relatively acute and the other at a relatively blunt angle with respect to the axis of the shell, each of said elements having also a central opening; and a retainer bolt extending through the openings of some of said elements.

7. In a friction shock absorbing mechanism, the combination with a friction shell having friction generating areas on the interior thereof, said shell being subject to expansion and contraction laterally; of a spring; and a friction unit comprised of a plurality of elements having a plurality of sets of cooperating blunt non-wedging faces and a plurality of sets of wedging faces when pressure is applied in a direction substantially parallel to the center line of the shell in a compression stroke, the faces of said non-wedging sets being relatively shiftable in release to facilitate collapse of the friction unit.

8. In a friction shock absorbing mechanism, the combination with a friction shell having friction-generating areas on the interior thereof, said shell being subject to expansion and contraction laterally; of a spring; and a friction unit comprised of a plurality of elements provided with a plurality of sets of cooperating faces extending at a relatively acute angle with respect to the axis of the shell and a plurality of sets of cooperating faces extending at a relatively blunt angle with respect to the axis of the shell, said sets of faces having such a relation that the application of forces in a compression stroke will exert a wedging movement on said sets of acute-angled faces only.

9. In a friction shock absorbing mechanism, the combination with a friction shell having friction-generating areas on the interior thereof, said shell being subject to expansion and contraction laterally; of a spring; and a friction unit comprised of a plurality of elements having a plurality of sets of cooperating blunt non-wedging faces and a plurality of sets of wedging faces when pressure is applied in a direction substantially parallel to the center line of the shell in a compression stroke, the faces of said non-wedging sets being relatively shiftable in release to facilitate collapse of the friction unit, each of said elements being of like construction.

10. In a friction shock absorbing mechanism, the combination with a friction shell having opposed friction surfaces on the interior thereof; of a spring; opposed friction shoes within the shell, said shoes, at each inner and outer set of ends thereof, having opposed faces inclined to the axis of the shell, one inclined face of each opposed set extending at an acute wedging angle and the other at an obtuse releasing angle; and an element at each end of said shoes having correspondingly inclined faces cooperable with said adjacent respective inclined faces of the shoes.

11. In a friction shock absorbing mechanism, the combination with a friction shell having opposed friction surfaces on the interior thereof; of a spring; opposed friction shoes within the shell, said shoes, at each inner and outer set of ends thereof, having opposed faces inclined to the axis of the shell, one inclined face of each opposed set extending at an acute wedging angle and the other at an obtuse releasing angle; and an element at each end of said shoes having correspondingly inclined faces cooperable with said adjacent respective inclined faces of the shoes, the blunt releasing angle faces at one end of the shoes being on the opposite side of the center line to the blunt angle releasing faces at the other end of the shoes.

12. In a friction shock absorbing mechanism, the combination with a friction shell having opposed friction surfaces on the interior thereof; of a spring; opposed friction shoes within the shell, said shoes, at each inner and outer set of ends thereof, having opposed faces inclined to the axis of the shell, one inclined face of each opposed set extending at an acute wedging angle and the other at an obtuse releasing angle; and an element at each end of said shoes having correspondingly inclined faces cooperable with said adjacent respective inclined faces of the shoes, the outer one of said elements being adapted to directly receive and transmit an actuating compressing force.

13. In a friction shock absorbing mechanism, the combination with a friction shell having interior longitudinally extending friction surfaces; of a spring; opposed friction shoes frictionally cooperable with the surfaces of said shell; an outer element; and an inner element, each of said elements having keen angle wedging engagement with a shoe and blunt releasing angle engagement with an opposed shoe.

In witness that I claim the foregoing I have hereunto subscribed my name this 28th day of June, 1920.

JOHN F. O'CONNOR.

Witnesses:
CARRIE GAILING,
UNA C. GRIGSBY.